April 24, 1956 — D. LEVIN — 2,742,964
CLOTH CUTTING TABLE AND MACHINE
Filed May 10, 1955 — 4 Sheets-Sheet 2

INVENTOR
David Levin
BY Brown & Seward
ATTORNEYS

April 24, 1956     D. LEVIN     2,742,964
CLOTH CUTTING TABLE AND MACHINE
Filed May 10, 1955     4 Sheets-Sheet 3
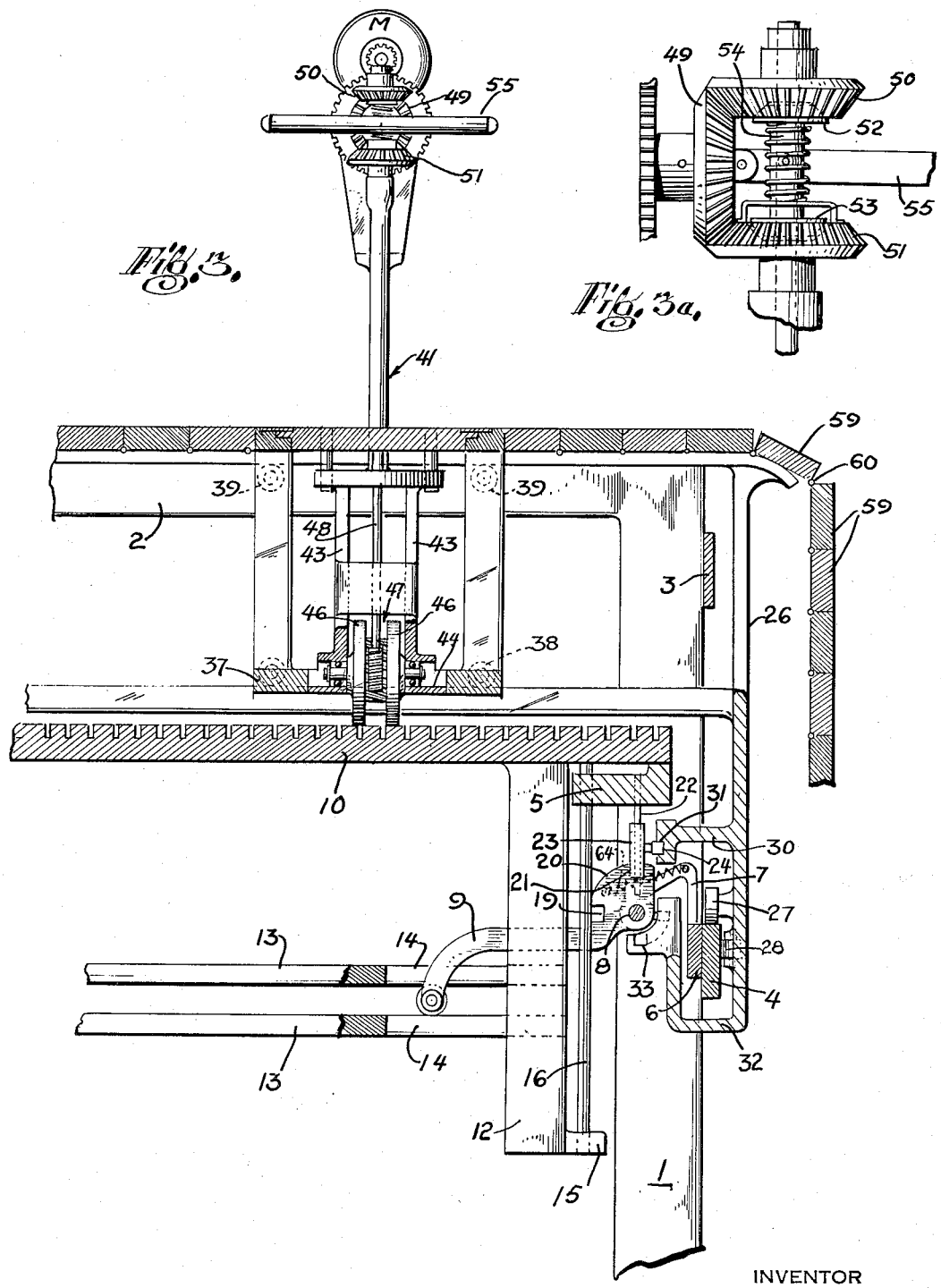
INVENTOR
David Levin
BY
Brown & Seward
ATTORNEYS April 24, 1956 D. LEVIN 2,742,964
CLOTH CUTTING TABLE AND MACHINE
Filed May 10, 1955 4 Sheets-Sheet 4
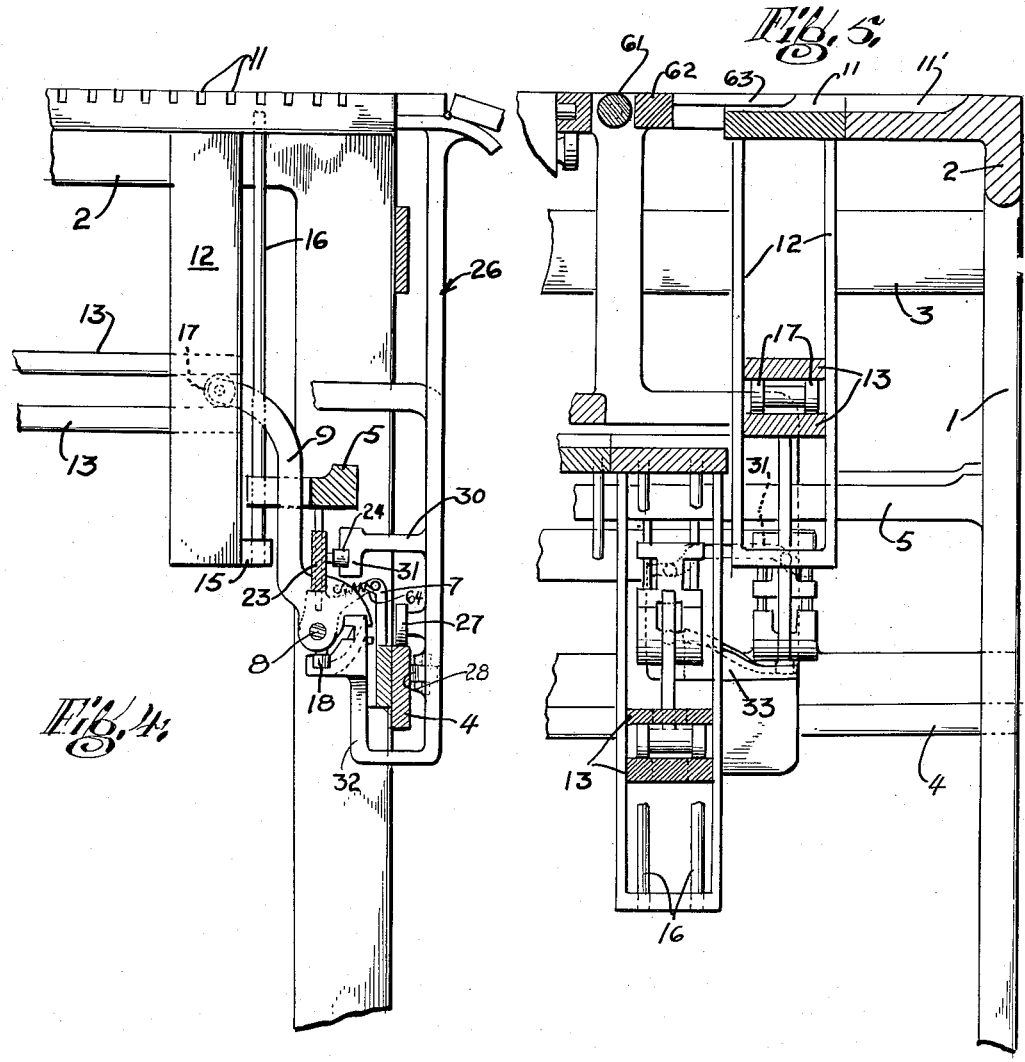
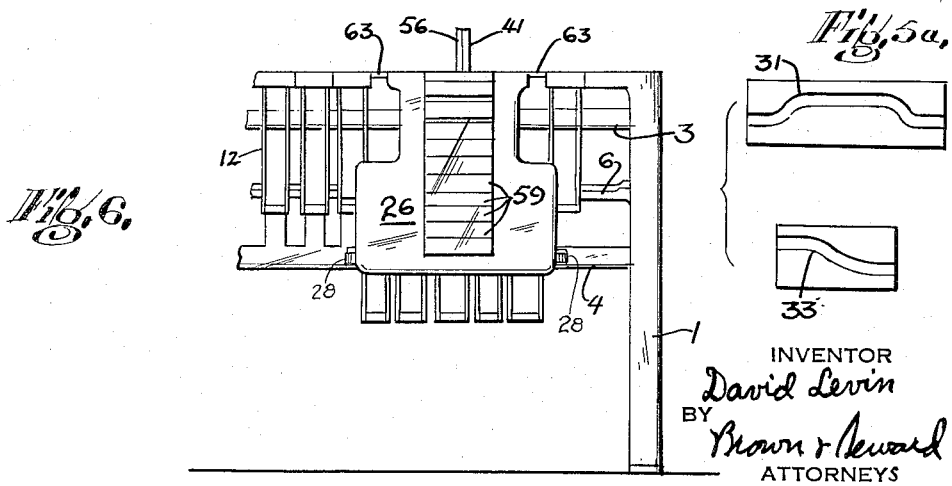
INVENTOR
David Levin
BY Brown & Seward
ATTORNEYS

United States Patent Office 2,742,964
Patented Apr. 24, 1956

2,742,964

CLOTH CUTTING TABLE AND MACHINE

David Levin, Brooklyn, N. Y.

Application May 10, 1955, Serial No. 507,409

10 Claims. (Cl. 164—75)

This invention relates to a cutting table and machine, for cutting according to a selected pattern and in a single operation, a plurality of superimposed plies (lay) of cloth, e. g., for use in the manufacture of garments. The invention comprises certain improvements in, and additions to, the cutting table disclosed in applicant's Patent No. 2,452,773, issued November 2, 1948.

An object of the invention is to provide such a table in which the lay to be cut is supported by a plurality of narrow identical sections extending transversely across the table, said sections being vertically movable between an upper, lay-supporting, position and a lower position.

Another object is to provide a cutter carriage having a surface adapted to be substituted as the lay support in areas where one or more of the movable sections are in their lower position.

A further object is to provide a mechanical cloth cutter having drive wheels adapted to engage the surface of depressed movable sections and manual controls for said cutter and wheels, so that the cutter can be power-driven in any direction.

Another object is to provide lay-supporting fingers extending from the cutter carriage at least farther than the greatest distance from said carriage to adjoining movable sections, so that there can be no gap on either side of said carriage through which the cloth to be cut could fall or sag.

A further object is to provide certain improvements in the form, construction and arrangement of the several parts by which the above-named and other objects may effectively be attained.

In the cutting table of the above cited Patent No. 2,452,773, the lay was supported on pivotally mounted supports disposed in staggered relation along the sides of the table and so controlled as to swing down out of the way when the cutter-carrying carriage approaches. A principal defect in such apparatus is the very tiring effort required to move the cutter along its pattern course through the lay. This defect is overcome here by the provision of a very flexible, easily controlled, power drive for the cutter. In the prior device, a further disadvantage resided in the spacing of the supports, which spacing has now been eliminated. Also, whereas the previously patented table was intended to be of extended length, the table shown herein is preferably only about two yards long and serves as the "operating" area, onto which the lay of cloth to be cut can be fed from an assembly area (preferably provided with conveyor belts), and from which the cut pieces can be taken by a suitable simple delivery means, also comprising a conveyor belt, if desired.

A practical embodiment of the invention is shown in the accompanying drawings, wherein Fig. 1 represents a top plan view of the cutting table;

Fig. 3 represents a detail vertical section on the line III—III of Fig. 2, parts being broken away;

Fig. 3a represents a detail elevation, on a larger scale, of the cutter drive gear control;

Fig. 4 represents a detail vertical section on the line IV—IV of Fig. 2, parts being broken away;

Fig. 5 represents a detail vertical longitudinal section on the line V—V of Fig. 1, parts being broken away;

Fig. 5a represents a detail elevation of the cam faces;

Fig. 6 represents a partial side elevation, on a reduced scale, as viewed from the right of Fig. 1.

Figure 1:
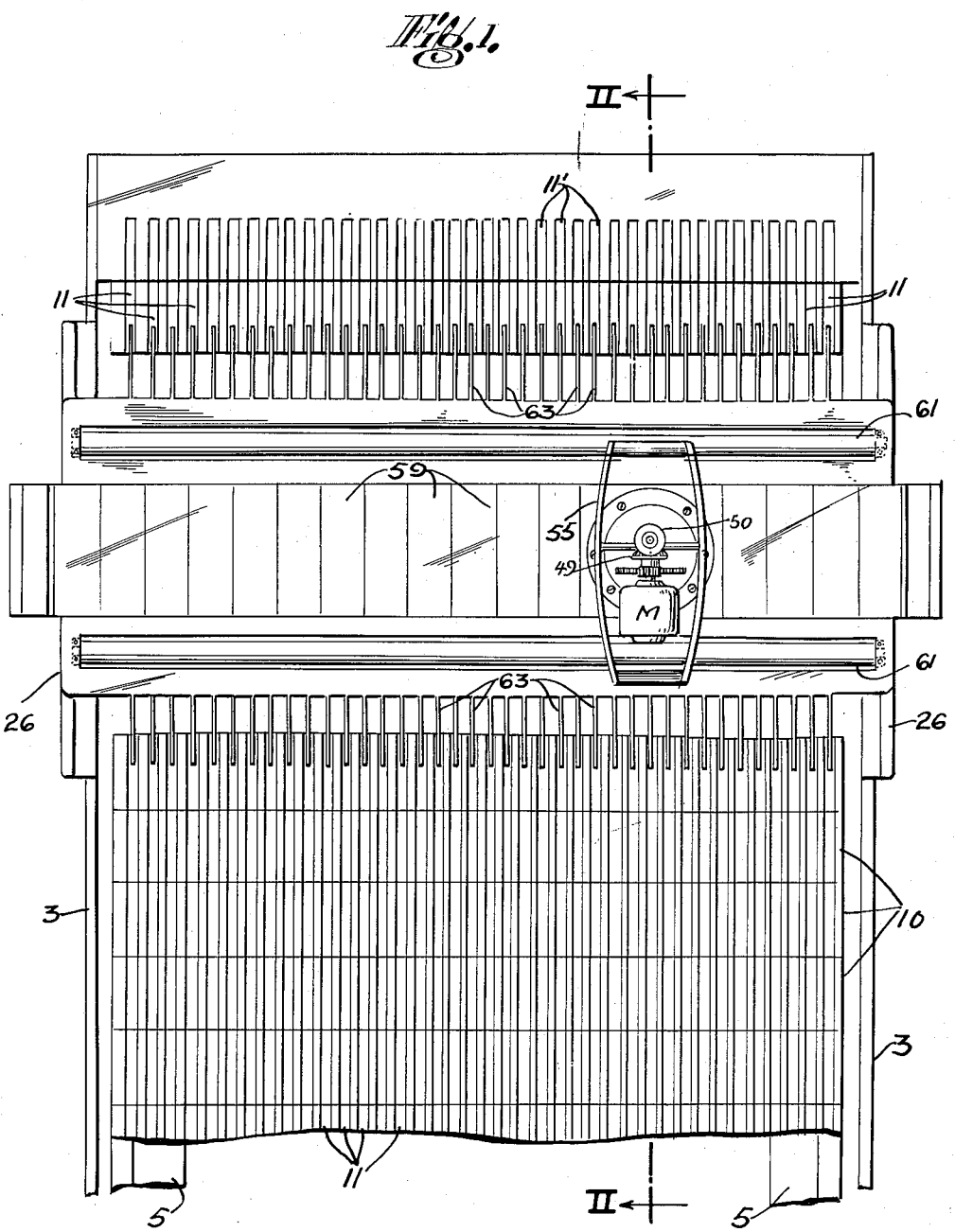

Referring to the drawings, the table comprises legs 1 (Figs. 2 to 6), and frame members 2 (Figs. 2, 3, 4 and 5), upper side rails 3, lower side rails 4 (Figs. 1 to 5), and inner side rails 5, which elements constitute the rigid skeleton or frame on which the other parts are variously mounted. A bracket bar 6 is shown as lying alongside the rail 4 (to which it may be welded or bolted) and as being provided with regularly spaced pairs of inwardly projecting gooseneck brackets 7, the inner ends of which provide bearings for the short shafts 8 of the lifting levers 9.

The table top as a whole is made up of the transversely extending deck strips 10 (vertically movable as explained below) and of the cutter carriage surface. Since the deck strips and their "elevator" mountings are identical throughout the machine, a description of one will be understood as applying to all. The deck strip 10 is formed preferably of metal about 3" to 4" wide and extending toward the sides of the machine to points inside the vertical projection of the side rails 3 (Figs. 3 and 4). The upper surface of the strip is provided with transverse grooves 11, which may be about 1/16" wide. The mounting for the deck strip includes vertical posts 12, in pairs located a short distance in from each end, upper and lower double track-ways 13 extending horizontally from the posts 12 on one end to the posts 12 on the other end, the track-ways having vertical medial openings 14, at least near their ends, in order to permit movement of the lifting levers 9 as required. The posts 12 may be provided with outward extensions 15 at their lower ends, the extensions having vertical holes in which are held the lower ends of the guide rods 16 which pass freely through holes in the inner side rails 5 (Fig. 3) and have their upper ends fixed in the deck strips 10.

The levers 9 have mounted on their inner end pairs of rollers 17 adapted to run on the track-ways 13 with a slight vertical clearance so that they can freely move the deck strip mounting either upward or downward. Adjacent their pivot points (shafts 8) each lever 9 is provided with a radially projecting cam follower 18, which may be either a plain pin or, preferably, a small roller on a stub shaft. Spaced 180° around the lever pivot point from the cam follower 18 the lever 9 is provided with a radial notch 19 adjacent to a widened arcuate portion 20 in which a second radial notch 21 may be formed, approximately 90° away from the notch 19.

Short guide bars 22 extend vertically from each bracket 7 to the side rails 5, and latch members 23 are slidably mounted on these bars so that they may be moved into and out of engagement with the notches 19 or 21. Each latch member 23 carries a cam follower 24 which projects horizontally outward and may be in the form of a pin or a roller.

The cutter carriage includes a pair of tracks 25 extending across the table and mounted on side supports 26 which pass downward outside the upper side rails 3. Vertical support for the carriage is afforded by the rollers 27, mounted on the inner surface of the supports 26 and adapted to run on the top of the lower side rails 4. Additional rollers 28 are mounted on vertical axles at the extremities of the supports 26 in order to bear against the outer vertical surface of the rails 4 and thus prevent yawing of the carriage. Below the tracks 25, the carriage is strengthened by the presence of horizontal stringers 29 also connecting the supports 26.

Cam-supporting brackets 30 extend inwardly from the supports 26, each carrying a latch cam 31 having a cam groove registering with the followers 24 and shaped to lift and lower the latches 23 as the cam is moved horizontally past said latches (Fig. 5a). Additional cam-supporting brackets 32 extend from the supports 26 around under the rails 4 and bars 6, each bearing a cam 33 having a helical cam groove extending around an arc of about 90° and being so disposed as to engage the cam followers 18, in order to swing the levers 9 between their upper and lower positions as the carriage (and the cams carried thereby) is moved. The cams 31 and 33 must naturally be placed and proportioned so that the latch members 23 are held out of engagement with the notches 19 or 21 while the levers 9 are being moved; that is, the cams 31 must lift the latch before the cams 33 can cause rotation in either direction, and the rotational movement must have been completed before the latch is returned to locking position. Thus the entire effective length of each cam 33 should be disposed opposite that part of the corresponding cam 31 which represents the lifted position of the latch member. On each side of the carriage there is one cam 33 which acts to swing the levers 9 downward and an oppositely twisted cam serving to swing the levers up again.

Figure 2:
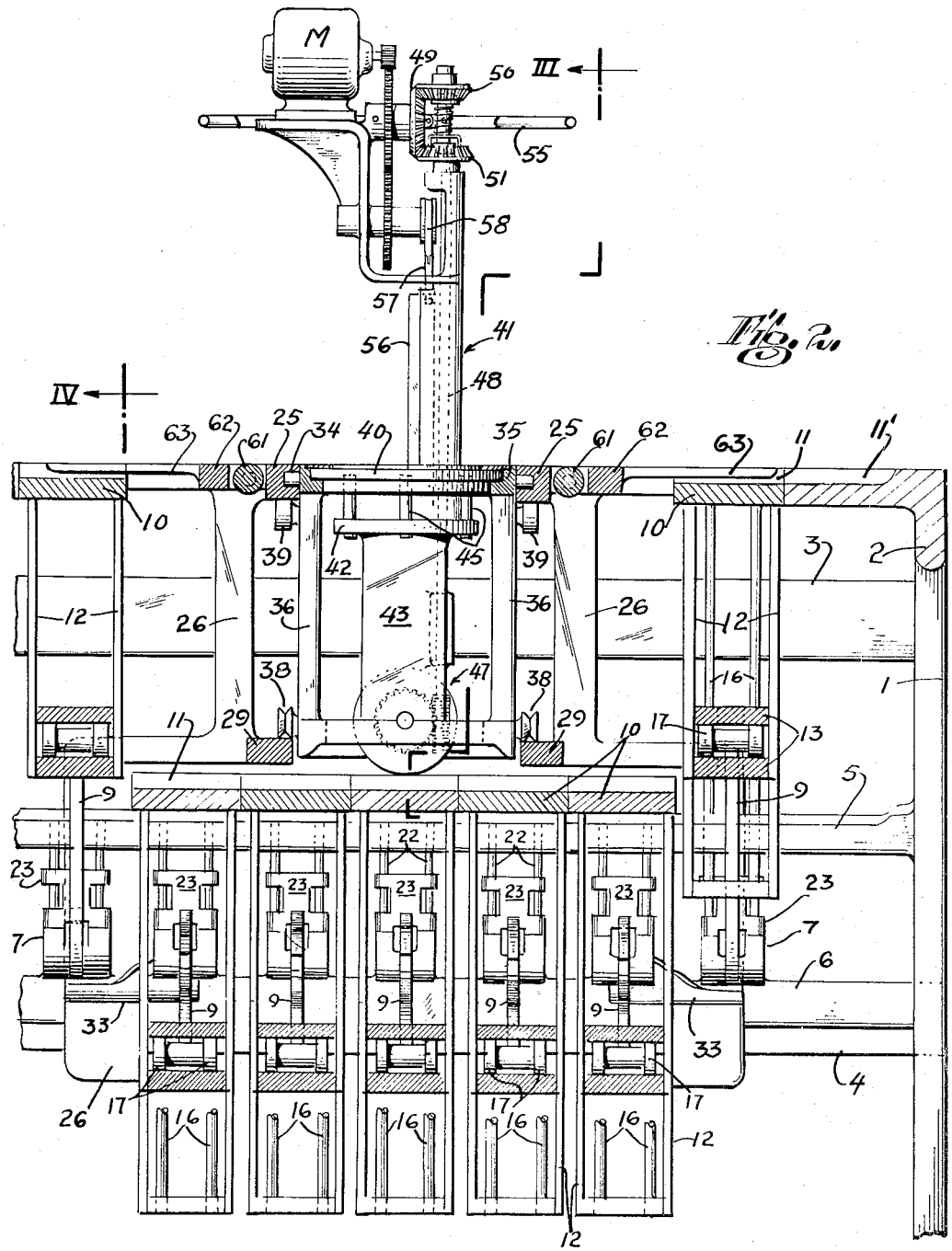
Fig. 2 represents a longitudinal vertical section on the line II—II of Fig. 1, with the cutter shown in elevation and parts being broken away.

The tracks 25 have slots or grooves 34 in their facing sides and a cutter mounting 35 is provided with pins, rollers or tongues fitting freely in said slots or grooves (Fig. 2). In order to stabilize the mounting, posts 36 extend downward from points near the corners of the mounting to a lower square frame 37. Rollers 38 (preferably of the concave rim type) are carried by said frame and run on tracks carried by the horizontal stringers 29; upper rollers 39 are arranged in position to bear against the bottom surfaces of the tracks in order to eliminate any possibility of jamming or tipping over of the cutter. The mounting 35 includes a circular rotatable turn-table 40 through which passes the cutter (described below).

The lower end of the cutter standard 41 is fixed on a disk 42, forming the top of a "cage" comprising side members 43 and a lower guide disk 44 which fits freely within a circular opening in the frame 37. The upper disk 42 (and the cage of which it is a part) is free to move vertically with respect to the turn-table 40, but these parts are keyed to rotate together by means of pins 45 fixed in the turn-table and fitting freely in holes in the disk 42. A pair of cutter driving wheels 46, fixed on a common axle, is journaled in bearings in the disk 44, the wheels preferably being provided with a leather tread, and the mid-point of their floor-engaging areas being on the vertical axis of the turn-table 40, the disk 42 and the disk 44. The wheels are designed to be driven, for instance, through the worm drive 47, by a shaft 48 passing through the cutter standard 41 and actuated by the cutter motor M through a suitable reversing gear. A conventional form of such gear is shown as comprising a bevel gear 49 driven by the motor, directly or through a reducing gear drive, as shown; a pair of bevel gears 50, 51 constantly in mesh with the gear 49; a pair of cone clutches 52, 53, slidably keyed on upper part 54 of the drive shaft 48; and an operating lever 55 which projects in both directions, with handles on each end, so that the operator can easily guide the cutter from any position adjacent the table.

The cutting blade 56 is reciprocated vertically by a link 57 connecting it to an eccentric 58 driven by the motor M. The blade may be mounted and guided in the standard 41 in any customary manner, including that disclosed in Ogden Patent No. 2,343,202, issued February 29, 1944. In the present arrangement it will be observed that the standard 41 extends below the turn-table 40 so that the blade 56 can also extend below the table-top level, for accurate and uniform cutting throughout the lay.

The mounting 35 forms part of a belt made up of blocks 59 hinged together at 60 and provided with pins, rollers or tongues which project into the grooves 34. The belt is long enough, on each side of the mounting 35, to extend across the full width of the table when the cutter mounting is moved either way to its extreme lateral position, the portion not in use at any given moment hanging down on the side of the table as clearly appears in Fig. 6. Parallel with each track 25 there are shown long rollers 61 mounted on the carriage, and parallel with each roller is a comb-bar 62 from which project the blade-like fingers 63. These fingers are spaced by distances such that they will fit cleanly in the grooves 11 of the deck strips, the ends of the fingers being preferably beveled slightly to eliminate the possibility of their catching either on the strips or on the cloth to be cut. At the ends of the machine additional grooves (11' in Fig. 2) may be formed in the fixed end frame members, so that the carriage can come closer to the ends.

In operation, the lay of cloth to be cut is moved onto the cutting table, preferably from a lay-out table or board over which pass one or more conveyor belts operable to move the layers of fabric deposited thereon. The cutting machine is necessarily in a position where it will not interfere with the locating of the lay on the cutting table. At any position of the cutter carriage, several of the deck strips are in their lowered position and the drive wheels 46 rest on them while supporting the cutter. With the cutter motor M running, the operator can turn the cutter through the full 360° around a vertical axis corresponding closely to the edge of the cutting blade, and can drive the cutter forward or backward in any direction, according to the pattern being followed, by operating the lever 55 to engage the cone clutch 52 or 53 with the respective bevel gears 50 or 51, and to steer the cutter. Lateral components of the movement of the cutter involve only travel of the hinged blocks 59, guided by the tracks 25, and corresponding movement of the cutter mounting 35 and associated parts, relative to the cutter carriage. Longitudinal components of the cutter movement require motion of the whole carriage; as the carriage moves (e. g., from left to right of Figs. 2 and 6, up in Fig. 1) the cams 31 and 33 on the "front" of the carriage—and on both sides of the table—engage the followers 24 and 18 to unlatch the lifting levers 9 of the nearest deck section and to swing the levers down so as to lower the section to its depressed position, where it is latched in place by engagement of the latches 23 with the notches 21. At the "rear" of the carriage, the operation is reversed; the cams 31 and 33 at that point release the latches from the notches 21 of the last depressed deck section and swing the corresponding lifting levers up so as to raise said section to its top position, where it is held by engagement of the latches 23 in the notches 19. At the table surface, at both front and rear of the carriage, the fingers 63 bridge over the gaps caused by rising or lowering deck sections and provide, in effect, a smooth and continuous supporting surface for the lay to be cut.

Since the cutter is power driven in all directions, with its wheels 46 having good traction at all times on the depressed deck strips, the frictional and inertia forces resisting movement of the various parts are readily overcome. It is advisable, however, to make use of customary mechanical expedients (ball bearings, etc.) for reducing friction and to counterbalance the considerable weight of the vertically movable deck sections, as by springs 64 on the lifting levers 9 or at other suitable points. The power drive of the cutter relieves the operator of almost all the strenuous effort now required to push a cutter through a heavy lay of cloth. After a section of the lay, two yards or so in length, has been cut on the cutting table according to pattern, it is moved off the delivery end of the table onto a receiving stand of any desired type, and removed for further processing.

While the cutting machine shown herein is of the reciprocating blade type, it will be understood that an endless chain cutter could be used with suitable adaptations, as proposed in Patent No. 2,452,773, referred to above. The specific form of reversing gear drive and clutch arrangement is merely one conventional form which appears suitable; it could be replaced by a belt-and-pulley drive with belt switching means of the type known for driving reversible machine tools. Since the cutter-supporting wheels are driven through worm gearing, providing a considerable step-down in speed and step-up in power, the motor and the pinions and bevel gears closely associated therewith can operate at the normal speeds necessary to assure rapid vibration of the cutter blade. The friction clutches, normally spring-held in neutral position, permit sufficient controlled slippage so that the cutter can be advanced or withdrawn as slowly as desired or as rapidly as the gear ratios permit. The wheels 46 constitute, in effect, one "dual" wheel with its parts separated just enough to accommodate the worm drive.

The long rollers 61 along each edge of the cutter carriage may be knurled, roughened or clothed in any desired manner so that they will act to prevent sideways slipping of the material to be cut, particularly when the direction of cutting has a component requiring motion of the cutter across the cutting table.

It is desirable that the surface level of the blocks 59 and fingers 63 should be slightly lower than the upper surface of the rollers 61 and the deck sections, so that the latter can bear most of the load and thus reduce the friction of the lay on movable parts of the cutter carriage.

The motor and connected operating parts will naturally be so disposed as to be approximately balanced over the center of the supporting and driving wheels.

It will be understood that various changes may be made in the form, construction and arrangement of the several parts without departing from the spirit and scope of the invention.

What I claim is:

1. A cutting table of the character described comprising a fixed frame, a plurality of narrow elongated deck sections disposed side by side and extending across the width of the table, means for moving each deck section vertically between an upper lay-supporting position and a uniform horizontal lower position, a carriage extending across the width of the table and supported by said frame for horizontal movement lengthwise of the table, a lay-supporting surface constituted by parts of said carriage, means on said carriage for causing elevated deck sections to move to said lower position in front of said carriage and for causing depressed deck sections to move to said lay-supporting position in back of said carriage as it advances, and a motor-driven cutting machine mounted on said carriage for rotation about a vertical axis corresponding approximately to the line of cutting of said machine and for horizontal movement across the width of said table.

2. An apparatus according to claim 1 which includes at least one drive wheel in frictional engagement with at least one deck section in depressed position, a reversible driving connection between the cutting machine motor and said wheel, and manual control means for rotating the cutting machine and controlling said driving connection.

3. An apparatus according to claim 2 in which the cutting machine is supported by said drive wheel.

4. An apparatus according to claim 2 in which there is a dual drive wheel and in which the driving connection includes a worm drive part of which is located between the parts of the dual drive wheel.

5. An apparatus according to claim 1 which includes guide means between each deck section and the frame for guiding said deck sections along a vertical path.

6. An apparatus according to claim 1 in which the deck section moving means include levers pivotally mounted on opposite sides of the frame and provided with cam followers, and in which the means on the carriage for causing the deck sections to move include cams engageable with said cam followers to move simultaneously said levers.

7. An apparatus according to claim 6 which includes latch means for locking said levers in at least one position, and means on the carriage for actuating said latch means.

8. An apparatus according to claim 1 which includes elongated rollers extending along two opposite edges of said carriage and constituting part of the lay-supporting surface.

9. A motor-driven cloth cutting machine comprising, vertically extending cutting means, a motor located above said cutting means, a driving and supporting wheel located below said cutting means and adapted to engage a horizontal surface at a point approximately corresponding to a downward extension of the vertical line of cutting, a driving connection between the motor and the cutting means, and a driving connection adapted for forward and reverse drive between the motor and said wheel.

10. A machine according to claim 9 which includes a steering and gear shifting lever projecting from said machine in at least two opposite horizontal directions.

References Cited in the file of this patent

UNITED STATES PATENTS

| | | |
|---|---|---|
| 2,211,082 | Smith | Aug. 13, 1940 |
| 2,452,773 | Levin | Nov. 2, 1948 |